United States Patent
Banerjee et al.

(10) Patent No.: US 10,321,544 B1
(45) Date of Patent: Jun. 11, 2019

(54) ACOUSTICS-BASED STREET LIGHT CONTROL

(71) Applicant: INTERNATIONAL BUSINESS MACHINES CORPORATION, Armonk, NY (US)

(72) Inventors: Dipyaman Banerjee, New Delhi (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/117,047

(22) Filed: Aug. 30, 2018

(51) Int. Cl.
- H05B 37/02 (2006.01)
- H04R 1/40 (2006.01)
- H04R 29/00 (2006.01)
- H04R 3/00 (2006.01)

(52) U.S. Cl.
CPC ......... H05B 37/0236 (2013.01); H04R 1/406 (2013.01); H04R 3/005 (2013.01); H04R 29/005 (2013.01); H05B 37/0245 (2013.01)

(58) Field of Classification Search
CPC H05B 37/02; H05B 37/0209; H05B 37/0227; H05B 37/0236; H04R 1/20; H04R 1/406; H04R 3/00; H04R 3/005
See application file for complete search history.

(56) References Cited

U.S. PATENT DOCUMENTS

| | | | |
|---|---|---|---|
| 5,345,232 A | | 9/1994 | Robertson |
| 5,878,367 A | * | 3/1999 | Lee .......................... G08G 1/04 340/943 |
| 9,420,674 B2 | | 8/2016 | Hartman et al. |
| 9,615,066 B1 | * | 4/2017 | Tran ........................ H04N 7/183 |
| 2012/0062123 A1 | * | 3/2012 | Jarrell ................ H05B 37/0245 315/131 |
| 2014/0372129 A1 | * | 12/2014 | Tzirkel-Hancock ... H04R 3/005 704/278 |
| 2016/0286627 A1 | | 9/2016 | Chen et al. |
| 2016/0286629 A1 | * | 9/2016 | Chen .................. H05B 37/0272 |

(Continued)

FOREIGN PATENT DOCUMENTS

| CN | 203554771 U | 4/2014 |
|---|---|---|
| WO | 2016156401 A1 | 10/2016 |

OTHER PUBLICATIONS

Chen et al., "Automatic Traffic Montoring by Intelligent Sound Detection", IEEE, 1998, pp. 171-176.

(Continued)

*Primary Examiner* — Jason Crawford
(74) *Attorney, Agent, or Firm* — Erik K Johnson

(57) ABSTRACT

A computer-implemented method for acoustics-based light source control of a lighting system is provided. The method may include detecting sounds emitted by a sound source from positions located along the path. A velocity of the sound source is determined with respect to a point on the path based on the detected sound emissions. A spatio-temporal trajectory of the sound source is based on the determined velocity and a topography of the path at the positions of the sound source. One or more light sources positioned adjacent to the determined trajectory are identified. Responsive to determining that a distance between the sound source and the identified light sources does not exceed a predetermined threshold, the identified light sources are energized to illuminate the length of the path ahead of the sound source.

20 Claims, 7 Drawing Sheets

(56) References Cited

U.S. PATENT DOCUMENTS

2017/0336061 A1* 11/2017 Riedel .................. B64C 39/024
2018/0146531 A1* 5/2018 Rinko ..................... F21S 8/086

OTHER PUBLICATIONS

Electronics Hub, "Street Lights That Glow on Detecting Vehicle Movement", printed Jun. 11, 2018, pp. 1-47.
Mell et al., "The NIST Definition of Cloud Computing", National Institute of Standards and Technology, Special Publication 800-145, Sep. 2011, pp. 1-7.

* cited by examiner

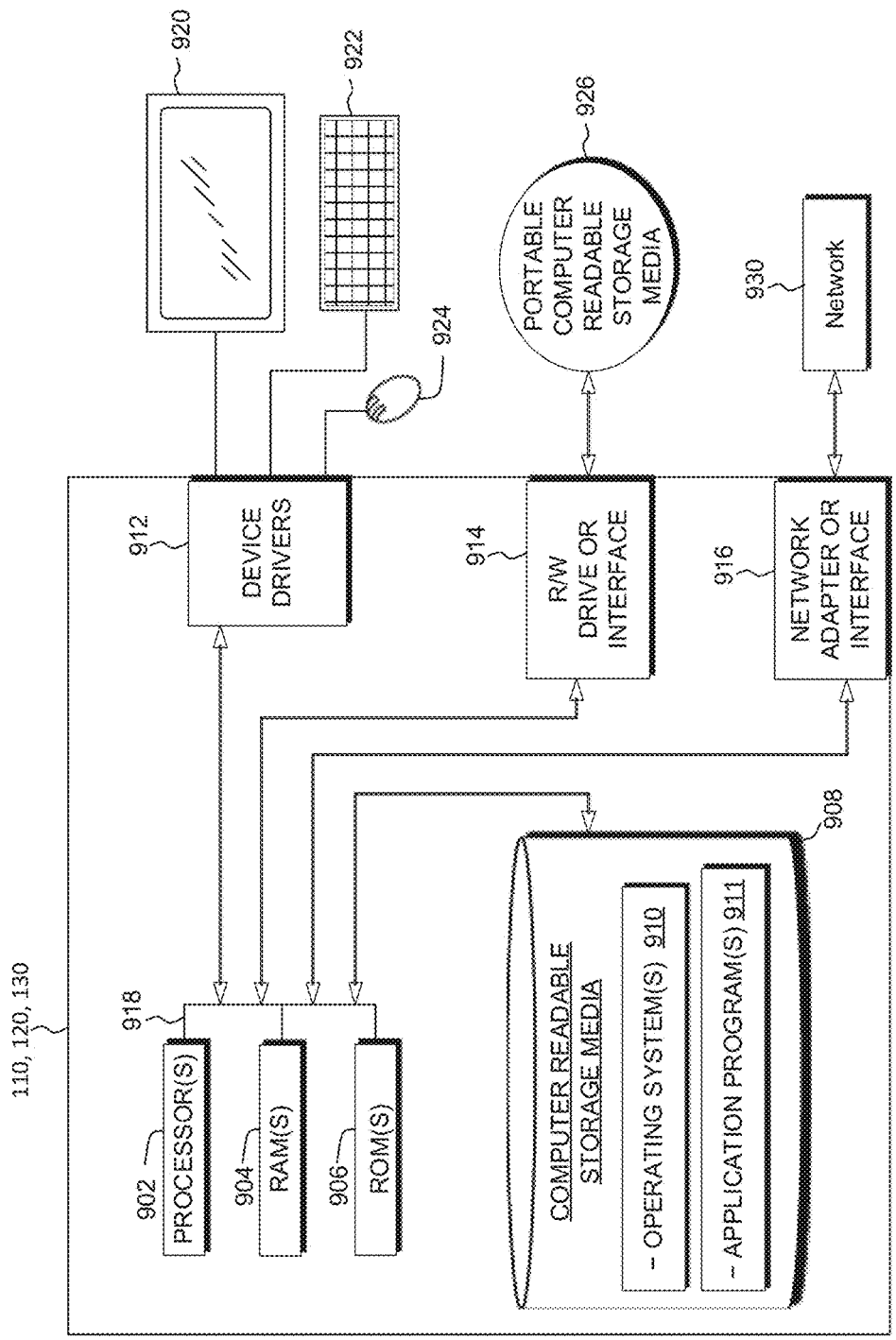

ACOUSTICS-BASED STREET LIGHT CONTROL

BACKGROUND

The present invention relates generally to the field of street light management, and in particular, to street light control for selective illumination of a path.

A lighting control system may be implemented in managing and controlling the operation of one or more individual light sources of a lighting system. The lighting system may be configured to illuminate an area, path, route, road, walkway, or thoroughfare ("path"). The lighting system may include, for example, an indoor and/or outdoor lighting network ("lighting system"), such as a street lighting system, a walkway lighting system, or the like. The light sources may include, for example, street lights, walkway lights, light poles, lampposts, street lamps, light standards, and/or lamp standards ("light source(s)"). The individual light sources of the lighting system may operate under the control of the lighting control system to selectively illuminate a path under predefined conditions indicative of and corresponding to one or more objects in motion (i.e. traffic) along the path. The one or more objects in motion along the path may include, for example, pedestrians, cyclists, vehicles, and the like.

SUMMARY

According to an aspect of the present invention, a computer-implemented method for acoustics-based light source control of a lighting system is provided. The method may include detecting sounds emitted by a sound source from positions located along the path. A velocity of the sound source is determined with respect to a point on the path based on the detected sound emissions. A spatio-temporal trajectory of the sound source is based on the determined velocity and a topography of the path at the positions of the sound source. One or more light sources positioned adjacent to the determined trajectory are identified. Responsive to determining that a distance between the sound source and the identified light sources does not exceed a predetermined threshold, the identified light sources are controlled to illuminate the length of the path ahead of the sound source.

BRIEF DESCRIPTION OF THE DRAWINGS

FIG. 4 is a block diagram depicting a light source, an acoustic sensor and/or a light source control device, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
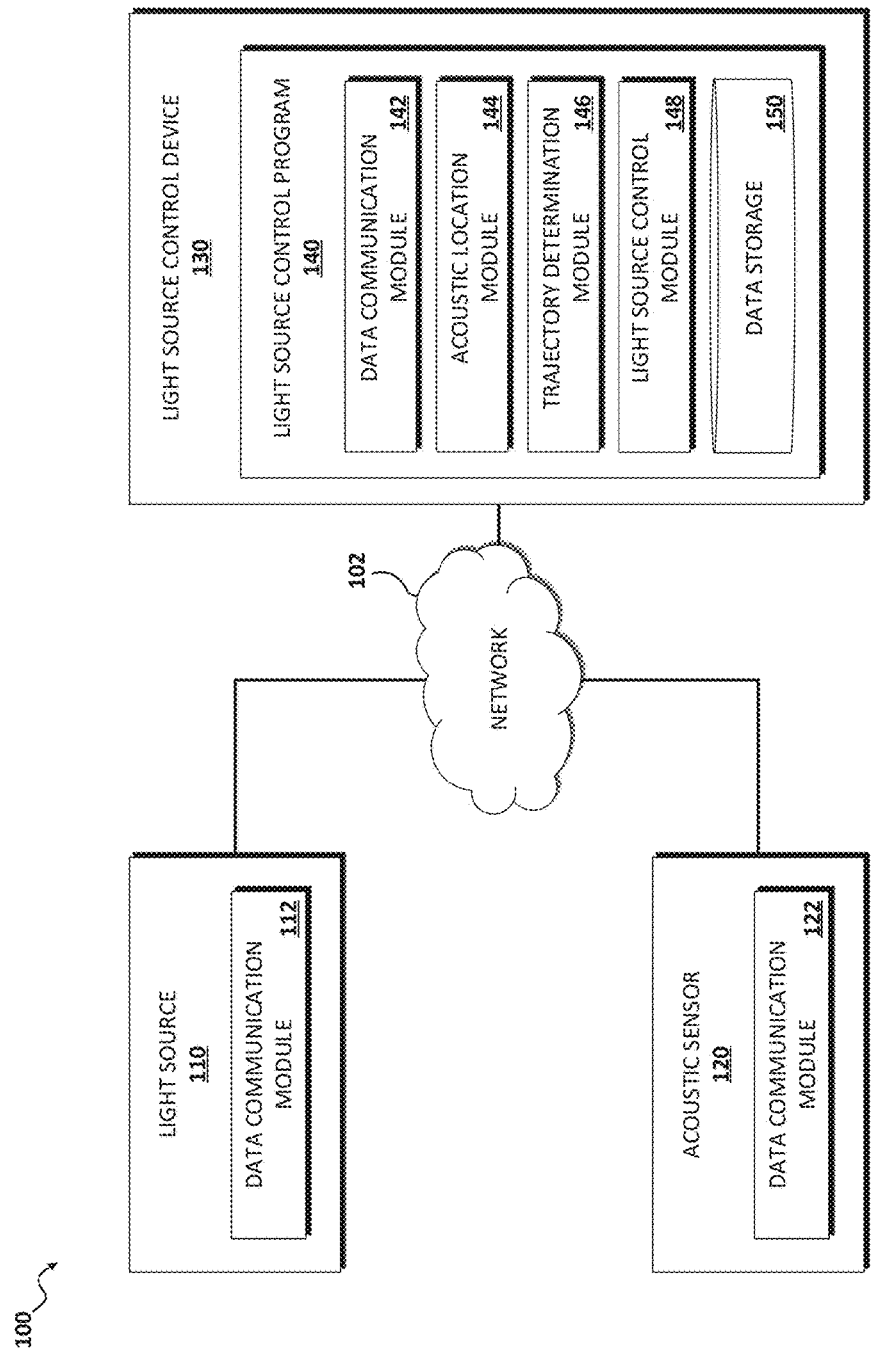
FIG. 1 is a functional block diagram depicting a light source control system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

A lighting control system may be implemented in conjunction with a lighting system to enable selective illumination of a path by one or more light sources of the lighting system. The lighting control system may be implemented to, for example, optimize overall lighting system operation of the lighting system by reducing power consumption, light pollution, and maintenance costs. For example, the lighting control system may be implemented in conjunction with a street lighting system to selectively illuminate a path such as a road on an as-needed basis by switching on light sources of the lighting system during the night and switching off the light sources of the lighting system during the day.

Illumination of a path may not be necessary when traffic is not present in or along the path. Therefore, further optimization of the lighting system operation may be achieved by implementing the lighting control system to switch off the light sources when illumination is not required (i.e. when no traffic is present along the path), and to switch on the light sources when illumination is required (i.e. when traffic is present along the path).

For example, a motion-based lighting control system may be implemented in optimizing lighting system operation by switching on light sources of a lighting system based on detected motion along a path. The detected motion may be identified in accordance with predefined conditions indicative of and corresponding to one or more objects in motion (i.e. traffic) along the path. As such, the predefined conditions may represent and correspond to conditions in which illumination may be required along the path, such as when traffic is present along the path. Conditions falling outside of the predefined conditions may represent and correspond to conditions in which illumination may not be required along the path, such as when traffic is not present along the path. Accordingly, the motion-based lighting control system may optimize lighting system operation by switching on light sources when motion is detected along the path, and switching off the light sources when motion is not detected along the path.

To detect the motion of one or more objects (i.e. traffic) along a path, a motion-based lighting control system may implement optical motion sensors such as cameras, infrared (IR), passive infrared (PIR), and/or radar sensors. Optical motion sensors are expensive to manufacture, install, and maintain in practice. Further, the accuracy, reliability, functionality, and overall performance of optical motion sensors can be reduced by various environmental- and weather-related conditions.

For example, environmental conditions including the topographic features or characteristics of an area (i.e. the arrangement of natural and artificial physical features of the area) can limit an effective operating range of optical motion sensors, in that features such as mountains, hills, winding roads, and other features including terrain with steep changes in elevation or otherwise forming obstructions in space, can effectively block or inhibit the propagation of optical signals. That is, an optical motion sensor requires a direct, unobstructed line-of-sight between an object to be detected and the sensor itself to function effectively. In turn, the motion-based lighting control system that implements the optical motion sensor also requires the direct, unobstructed line-of-sight to function effectively.

As another example, visibility-reducing weather conditions such as rain, snow, sleet, hail, fog, and the like, can also effectively diminish or inhibit the propagation of optical signals through space (e.g. via reflection, diffraction, refraction, etc.), and thereby reduce the accuracy, reliability, functionality, and overall performance of optical motion sensors. In turn, the accuracy, reliability, functionality, and overall performance of the motion-based lighting control system that implements the optical motion sensors may also be reduced under such conditions, causing suboptimal lighting system operation.

Accordingly, there is a need in the art for a method of selectively illuminating a path based on detected motion along the path that overcomes the aforementioned problems associated with managing and controlling the operation of one or more individual light sources of a lighting system by optically detecting the motion along the path, as such may be limited by various environmental- and weather-related conditions.

Embodiments of the present invention are directed to a method, system, and computer program product for acoustics-based light source control of a lighting system. The lighting system may be configured to illuminate a path.

In various embodiments, the method may include detecting, by one or more acoustic sensors, sounds emitted by one or more sound sources from positions located along the path. The method may further include determining a velocity of the one or more sound sources with respect to a point on the path based on the detected sound emissions. The method may further include determining a spatio-temporal trajectory of the one or more sound sources based on the determined velocity and a topography of the path at the positions of the one or more sound sources, wherein the trajectory corresponds to a length of the path and is associated with a direction of motion of the one or more sound sources along the path. The method may further include identifying one or more light sources of the lighting system positioned adjacent to the determined trajectory; and in response to determining that a distance between the one or more sound sources and the identified light sources does not exceed a predetermined threshold, changing or otherwise adjusting a control setting of the identified light sources to illuminate the length of the path ahead of each of the one or more sound sources. Changing the identified light sources may include adjusting the illumination intensity (i.e. brightening or dimming) by each of the light sources. Additionally, changing the identified light source may include turning the light source off or on. Further, changing the identified light source may include changing other characteristics of the light source, such as hue.

Advantageously, the present invention overcomes the aforementioned problems associated with managing and controlling the operation of one or more individual light sources of a lighting system by optically detecting motion along a path. In particular, the present invention implements acoustic motion sensors to detect the motion along the path to thereby enable increased accuracy, reliability, functionality, and overall performance of a motion-based lighting control system. Further, the present invention may be implemented to set or modulate illumination intensity levels of individual light sources and vary other lighting system parameters based on the detected motion to further optimize lighting system operation. To that end, the present invention may be implemented to facilitate optimization of lighting system operation, as well as to expand the range of environments in which a motion-based lighting control system may be effectively deployed to manage and control the operation of one or more individual light sources of a lighting system based on detected motion. Further, the present invention is cost-effective to install and maintain and flexible to implement in practice. Other advantages may be readily apparent to those of skill in the art from the figures, descriptions, and claims herein.

For purposes of the present disclosure, a "sound source" may refer to an object in motion along a path to be illuminated. For example, a sound source may include a pedestrian, cyclist, vehicle, and the like.

FIG. 1 is a functional block diagram depicting light source control system 100, in accordance with an embodiment of the present invention. Light source control system 100 may include light source 110, acoustic sensor 120, and light source control device 130 interconnected over network 102. While FIG. 1 depicts light source control system 100 as including three discrete devices, other arrangements may be contemplated. For example, light source control system 100 may include a light source array and a sensor array formed by numerous devices such as light source 110 and acoustic sensor 120, respectively. Further, light source control system 100 may include a controller network formed by at least two interconnected devices such as light source control device 130. In various embodiments, light source 110, acoustic sensor 120, and/or light source control device 130 may be formed by one or more integrated or distinct devices.

In various embodiments, network 102 may include an intranet, a local area network (LAN), a personal area network (PAN), a wireless local area network (WLAN), a wireless personal area network (WPAN), a wireless mesh network, a wide area network (WAN) such as the Internet, or the like. Network 102 may include wired, wireless, or fiber optic connections. Generally, network 102 may include any combination of connections and protocols for supporting communications between light source 110, acoustic sensor 120, and light source control device 130, in accordance with embodiments of the present invention.

In various embodiments, light source 110, acoustic sensor 120, and/or light source control device 130 may include a computing platform or node such as a microcontroller, a microprocessor, a wearable device, an implantable device, a mobile or smart phone, a tablet computer, a laptop computer, a desktop computer, a server such as a database server, a virtual machine, or the like. In the various embodiments, light source 110, acoustic sensor 120, and/or light source control device 130 may otherwise include any other type of computing platform, computer system, or information system capable of sending and receiving data to and from another device, such as by way of network 102. In certain embodiments, light source 110, acoustic sensor 120, and/or light source control device 130 may include internal and external hardware components, such as described with reference to FIG. 3. In other embodiments, light source 110, acoustic sensor 120, and/or light source control device 130 may be implemented in or by way of a cloud computing environment, such as described with reference to FIGS. 4 and 5.

Light source 110 hosts data communication module 112. Light source 110 may implement a combination of devices and technologies such as network devices and device drivers to support the operation of data communication module 112, and provide a platform enabling communications between light source 110, acoustic sensor 120, and light source control device 130, in accordance with embodiments of the present invention. Light source 110 may include, for example, a platform for supporting a raised source of light above a path to be illuminated, such as at a position located along, on, or about (collectively, "along") an edge of the path. Light source 110 may be controlled by light source control device 130 to illuminate a portion of the path coinciding with the position and location of light source 110 along the path.

In various embodiments, light source control system 100 may include a light source array formed by at least two devices such as light source 110. The light source array may be implemented to selectively illuminate distinct portions (i.e. lengths) of a path. Each lighting element (i.e. light source 110) of the light source array may be, for example, arranged in tandem along and adjacent to a path to be illuminated by light source control system 100. The light source array may otherwise be arranged and positioned along and adjacent to any type of path along which traffic (e.g., a pedestrian, cyclist, vehicle, etc.) may move or travel, in accordance with embodiments of the present invention.

Data communication module 112 may include an application or program such as a software program, one or more subroutines contained in a program, an application programming interface, or the like. For example, data communication module 112 may include a network interface controller, a radio receiver, and/or any other type of electronic device that is compatible with light source 110, and capable of receiving data from another device, such as by way of network 102. As an example, data communication module 112 may be implemented in enabling communications with a computing platform such as light source control device 130, for receiving commands or instructions by which light source 110 may be controlled and operated to selectively illuminate a path.

In various embodiments, data communication module 112 may receive commands from one or more devices of a controller network of light source control system 100. The controller network may include devices such as light source control device 130.

Acoustic sensor 120 hosts data communication module 122. Acoustic sensor 120 may implement a combination of devices and technologies such as network devices and device drivers to support the operation of data communication module 122, and provide a platform enabling communications between light source 110, acoustic sensor 120, and light source control device 130, in accordance with embodiments of the present invention. In various embodiments, acoustic sensor 120 may include, for example, a transducer such as a microphone, an acoustic distance or range finder, and/or an acoustic localization device. Acoustic sensor 120 may be implemented to generate acoustic data representative of and corresponding to environmental conditions in an area of a path to be illuminated by light source control system 100. For example, acoustic sensor 120 may include a uni-, bi-, or omni-directional microphone.

In various embodiments, light source control system 100 may include a sensor array including one or more devices such as acoustic sensor 120. The sensor array may be implemented to generate acoustic data representative of and corresponding to environmental conditions in an area or along a length of a path to be illuminated by light source control system 100. The transducer elements (i.e. discrete instances of acoustic sensor 120) of the sensor array may be positioned, for example, at regular intervals along the path to be illuminated. For example, each individual element of the sensor array may be positioned at regular intervals along the path by attachment to corresponding elements (i.e. light sources) of the light source array. The elements of the sensor array may otherwise be positioned at regular intervals, or with regular spacing, in an area encompassing the path to be illuminated to detect acoustic signals (i.e. sound) emitted by objects from positions located along or about the path, in accordance with embodiments of the present invention.

Data communication module 122 may include an application or program such as a software program, one or more subroutines contained in a program, an application programming interface, or the like. For example, data communication module 122 may include a network interface controller, a radio receiver, and/or any other type of electronic device that is compatible with acoustic sensor 120, and capable of receiving data from another device, such as by way of network 102. As an example, data communication module 122 may be implemented in enabling communications with a computing platform such as light source control device 130, for sending acoustic data by which light source 110 may be controlled to selectively illuminate a path.

In various embodiments, data communication module 122 may send acoustic data generated by acoustic sensor 120 to one or more devices of a controller network of light source control system 100. The controller network may include one or more devices such as light source control device 130.

Light source control device 130 hosts light source control program 140. Light source control device 130 may implement a combination of devices and technologies such as network devices and device drivers to support the operation of light source control program 140, and provide a platform enabling communications between light source 110, acoustic sensor 120, and light source control device 130, in accordance with embodiments of the present invention. Light source control device 130 may include, for example, a microcontroller, a microprocessor, or any type of electronic circuitry including, for example, programmable logic circuitry, field-programmable gate arrays (FPGA), or programmable logic arrays (PLA) that may execute computer readable program instructions by utilizing state information of the computer readable program instructions to personalize the electronic circuitry, to perform aspects of the present invention.

In various embodiments, light source control system 100 may include a controller network formed by at least two interconnected control devices such as light source control device 130. The controller network may be implemented to distribute control over one or more lighting elements of the light source array among at least two control devices such as light source control device 130. For example, a first control device of the controller network may control the operation of one or more lighting elements located along a proximal length of the path to be illuminated by light source control system 100, while a second control device of the controller network may control the operation of one or more lighting elements located along a terminal length of the path to be illuminated. That is, each control device (i.e. instance of light source control device 130) of the controller network may be implemented to control the operation of at least one lighting element of the light source array so as to selectively illuminate a specific portion or length of a path, in accordance with embodiments of the present invention.

Light source control program 140 includes data communication module 142, acoustic location module 144, trajectory determination module 146, light source control module 148, and data storage 150. Light source control program 140 may include an application or program such as a software program, one or more subroutines contained in a program, an application programming interface, or the like. In various embodiments, light source control program 140 may communicate with one or more light sources such as light source 110 as well as one or more transducers such as acoustic sensor 120 in controlling lighting system operation to selectively illuminate a path. For example, light source control program 140 may generate operating instructions based on acoustic data received from acoustic sensor 120 for communication to light source 110 for selective illumination of a specific portion or length of a path.

Data communication module 142 communicates with one or more transducer elements such as acoustic sensor 120 to receive acoustic data corresponding to environmental conditions in an area or along a length of a path to be illuminated by light source control system 100. Data communication module 142 further communicates with one or more lighting elements such as light source 110 to send operating instructions for selectively illuminating the area or length of the path corresponding to the location of the one or more lighting elements to which the operating instructions may be sent. Data communication module 142 may store the data in data storage 150 for later retrieval and use by light source control program 140.

In an embodiment, data communication module 142 may communicate with one or more control devices of the controller network of light source control system 100, as previously described. For example, an instance of data communication module 142 hosted on a first control device such as light source control device 130 may communicate with another instance of data communication module 142 hosted on a second control device such as light source control device 130, to send and/or receive acoustic data or operating instructions. The first control device may communicate with the second control device to send operating instructions for execution by the lighting elements controlled by the second control device. Data communication module 142 may otherwise communicate with other control devices such as light source control device 130 to enable selective illumination of a portion of a path based on acoustic data corresponding to an object in motion along the path, in accordance with embodiments of the present invention.

Acoustic location module 144 determines a velocity of one or more objects in motion along the path to be illuminated based on acoustic data generated by one or more transducer elements such as acoustic sensor 120. The one or more transducer elements may include those positioned at locations corresponding to those of the objects in motion along the path. In various embodiments, the velocities of the objects in motion may be determined, for example, by way of acoustic location of the objects along the path. For example, the velocities may be determined based on corresponding, acoustically located positions of the objects along the path. Acoustic location module 144 may otherwise determine a position, direction of movement, speed, and/or number of the objects in motion along the path based on the generated acoustic data to facilitate selective illumination of the path, in accordance with embodiments of the present invention. Acoustic location module 144 may implement various digital signal processing (DSP) techniques, sound source localization techniques, sound source distance measurement techniques, and the like, which may be chosen as a matter of a design with respect to path conditions and a topography of the path to be illuminated.

Trajectory determination module 146 determines spatio-temporal trajectories of the objects along the path. In an embodiment, the spatio-temporal trajectories may be determined based on the velocities of the objects in motion along the path. In the embodiment, the spatio-temporal trajectories may additionally be determined based on topography data corresponding to geographic or geospatial features or characteristics of the path or the area of the path at the positions of the objects in motion. The topography data may be retrieved, for example, from a geographic information system (GIS), a geographic information database, or the like. The topography data may otherwise be uploaded to the light source control device 130, or otherwise made available to light source control program 140, in a manner that may be chosen as a matter of design.

For purposes of the present disclosure, "spatio-temporal trajectory" as used herein refers to the path followed by an object in motion over time. The trajectory may be determined to anticipate the path along which the object in motion will travel at a given point in time.

Light source control module 148 identifies one or more light sources under the control of light source control system 100 that are positioned adjacent to the determined trajectories of the objects in motion along the path, determines whether a distance between one or more of the objects and the identified light sources exceeds a predetermined threshold, and controls operation of the identified light sources to selectively illuminate the path at locations generally coinciding with the locations of the objects in motion along the path.

Figure 2:
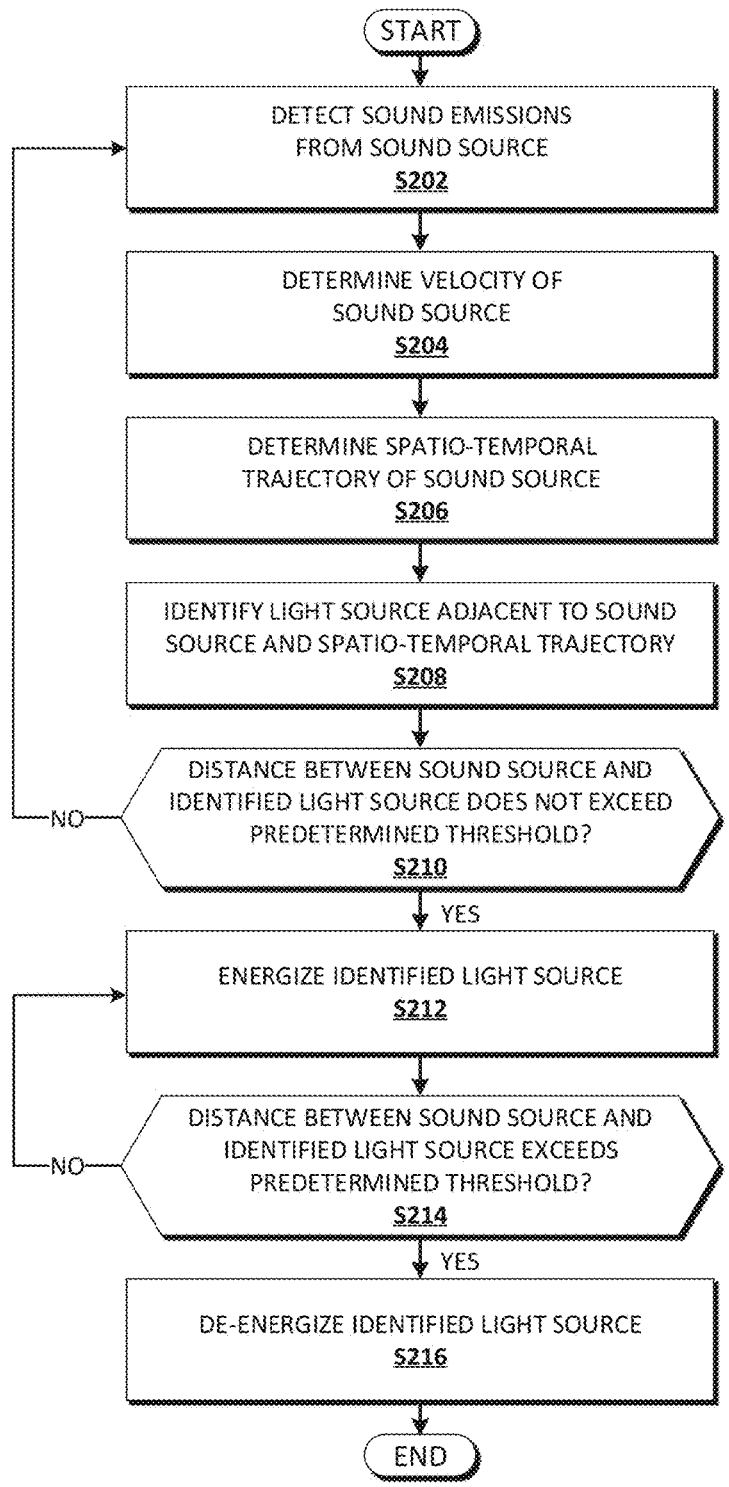
FIG. 2 is a flowchart depicting operational steps of an aspect of the light source control system, in accordance with an embodiment of the present invention.

FIG. 2 is a flowchart depicting operational steps of an aspect of light source control system 100, in accordance with an embodiment of the present invention.

At Step S202, acoustic signals (i.e. sounds) emitted by an object in motion are detected from and with respect to positions located along the path to be illuminated. The sound emissions from and by the object may be detected by one or more transducers such as acoustic sensor 120. In various embodiments, the detected sounds may be received by data communication module 142 from the one or more detecting transducers.

At step S204, acoustic location module 144 and trajectory determination module 146 determine a velocity of the object in motion with respect to the path based on the detected and received sound emissions.

In an embodiment, the velocity of the object in motion may be determined based on a first and second position of the object at first and second time instances, respectively. That is, at time $t_1$, a first position of the object may be determined, and subsequently, at time $t_2$, a second position of the object may be determined. The positions of the object may be determined based on acoustic data (i.e. acoustic signals) corresponding to the first and second positions, respectively, as such may be detected by acoustic sensor 120. In the embodiment, acoustic sensor 120 may include an acoustic range finder or an acoustic position localizer to determine the positions.

In the embodiment, after determining the first and second positions of the object, a direction of motion of the object may be determined based on difference between the distance between the first position of the object from a reference point, and the distance between the second position of the object from the reference point, respectively. For example, the reference point may be chosen to coincide with the position of acoustic sensor 120, such that the direction of motion of the object may be determined to be oriented away from acoustic sensor 120 when the distance between the first position of the object from the reference point is greater than the distance between the second position of the object from the reference point, and further, may be determined to be oriented towards acoustic sensor 120 when the distance between the first position of the object from the reference point is less than the distance between the second position of the object from the reference point. The reference point may be chosen to coincide with a position located along the path.

For example, where the reference point coincides with a position of acoustic sensor 120, the direction of motion may be determined to be oriented away from the detecting transducer if the second position is determined to be a greater distance away from the transducer than is the first position. In the embodiment, after determining the direction of motion of the object, a speed of the object may be determined by dividing a first quantity, defined by the difference between the first and second distances, by a second quantity, defined by the time lag in detecting the acoustic signals corresponding to the first and second distances of the object from the reference point. Accordingly, the speed and direction (i.e. the velocity) of the object in motion may be determined. In general, any sound localization or sound ranging technique may be implemented in determining the positions of the object, in accordance with embodiments of the present invention.

In an embodiment, the velocity of the object in motion may otherwise be determined without localizing or distance ranging positions of the object in motion. In this embodiment, the velocity of the object may be determined based on acoustic signals detected acoustic sensor 120. In the embodiment, a direction of motion of the object in motion may be determined based on amplitude variations (i.e. sound intensity) of detected acoustic signals from the object. That is, where the amplitude of the detected sound from the object are consistently increasing, the direction of motion of the object may be determined to be oriented towards acoustic sensor 120, and therefore the object may be determined to be approaching acoustic sensor 120. In the embodiment, a position of the object in motion may be determined to correspond with a position of acoustic sensor 120 at a point in time when the sound intensity of the detected sound, as detected by acoustic sensor 120, transitions from increasing to decreasing ("transition point"). That is, the point in time when the sound intensity begins to decrease corresponds to the point in time at which the object in motion moves past the first acoustic sensor along the path, and is therefore moving away from acoustic sensor 120. In the embodiment, a first position of the object along the path may be determined to correspond with a position of acoustic sensor 120 at the transition point. In the embodiment, the point in time when the sound intensity begins to decrease may be associated with a first time instance, $t_1$. The same process may subsequently be applied in conjunction with a second acoustic sensor such as acoustic sensor 120 that may be positioned ahead of the object in motion along the path, to determine that a second position of the object corresponds to a position of the second acoustic sensor at a second time instance, $t_2$. In the embodiment, the direction of motion of the object may be determined based on the relative locations of the first and second acoustic sensors, or with respect to first and second reference points corresponding to the locations of the first and second acoustic sensors, respectively, as well as an order in which the position of the object in motion coincides with the first and second detecting transducer. In the embodiment, the doppler effect may additionally be implemented in determining the velocity of the object.

For example, the direction of motion may be determined to be oriented from a first acoustic sensor toward the second acoustic sensor if the position of the object in motion coincides with that of the first acoustic sensor, and subsequently that of the second acoustic sensor. In the embodiment, the speed of the object in motion may be determined based on a time period (i.e. time lag) defined by the first and second time instances, $t_1$-$t_2$, with respect to a distance between the first and second acoustic sensors. For example, the speed may be determined by division of the distance by the time period (i.e. the time lag), $t_1$-$t_2$. In the embodiment, the distance between the first and second reference points may be determined based on the locations of the first and second detecting transducers and the topography of the path or area encompassing the first and second transducers. The topography of the area may be determined based on the topography data, as previously described.

At step S206, trajectory determination module 146 determines a spatio-temporal trajectory of the object in motion. The spatio-temporal trajectory of the object in motion may include an anticipated path along which the object in motion may travel with respect to the path to be illuminated, given a determined velocity of the object in motion at a prior point in time.

In an embodiment, the spatio-temporal trajectory may be determined based on the velocity determined at Step S204, with respect to the topography data corresponding to the topography of the path and area at the location of the object in motion.

In various embodiments, the spatio-temporal trajectory may include or correspond to a length of the path ahead of the object in motion. The topography of the path and area may be determined based on the topography data, as previously described.

In an embodiment, the topography data may be implemented in generating a fine-grained external geo-map, such as an "accurate" version of Google Maps (or some other satellite map, or locally serviced external map), which may be invoked with the current GPS position, and a current direction of an object in motion along a path to be illuminated.

For example, if there is a vehicle approaching a T-junction, we may need to light up lights positioned along both the branches, as the spatio-temporal trajectory of the vehicle may correspond to either of the branches as the vehicle makes its approach towards the junction. After the vehicle has turned onto and travels along one of the branches, the light sources positioned along the untraveled branch may be switched off. Advantageously, the topography of the path may be implemented in optimizing lighting system operation as well as visibility for the driver of the vehicle by adaptively controlling light sources to provide illumination only as required. Further, the topography data may help to disambiguate sounds reflected from obstacles such as flyovers and underpasses from sounds emitted by the vehicle to increase the accuracy of the trajectory determinations.

At step S208, light source control module 148 identifies or determines one or more lighting elements such as light source 110 positioned adjacent to and within a minimum distance range of the determined spatio-temporal trajectory of the object in motion. In an embodiment, the identified lighting elements may be identified so as to include those lighting elements positioned closest to the trajectory of the object in motion at the time of the identification. In the embodiment, the one or more lighting elements may be identified based on the topography data with respect to the determined trajectory of the object in motion, as determined at Step S206. For example, the identified lighting elements may include those starting from "a few" street lights behind, to "a few" street lights ahead, by geometrically superimposing the road view of the map, the GPS position of the vehicle(s), and the GPS position of the street lights onto a map generated based on the topography data at the location of the object in motion.

In an embodiment, identifying the one or more lighting elements may include generating a controller (e.g. light source control device 130) communication graph or network with respect to positions of individual control devices of the controller network of light source control system 100. In the embodiment, the communication graph may be determined and generated based on the topography data with respect to the determined spatio-temporal trajectory. The communication graph may be implemented in determining which control device to send generated operating instructions and/or receive acoustic data. In the embodiment, the one or more controllers positioned adjacent to the determined spatio-temporal trajectory of the object in motion may be determined based on the generated communication graph.

At step S210, light source control module 148 determines whether a distance between the object in motion and the identified light sources exceeds a predetermined threshold. If it is determined that the distance between the object in motion and the identified light sources exceeds the predetermined threshold, the method proceeds back to Step S202 to re-implement the method of the present invention. In the embodiment, the predetermined threshold may be defined in terms of a safe distance by which travel of the object in motion along the path may be sustained. In general, the predetermined threshold may be defined based on the path to be illuminated.

At step S212, light source control module 148 controls operation of the identified light sources to illuminate a length of the path ahead of the object in motion. In an embodiment, the identified light sources may be controlled to energize in response to determining that a distance between the object in motion and the identified light sources does not exceed the predetermined threshold, as described with reference to Step S210. In the embodiment, light source control module 148 may generate, and optionally communicate to another control device (e.g. such as light source control device 130), operating instructions for controlling one or more of the identified light sources. In the embodiment, the operating instructions may be generated and implemented so as to illuminate the path ahead of the object in motion. That is, the operating instructions may be implemented in controlling one or more of the identified light sources to energize before arrival of the object in motion at a location of the identified and subsequently energized light sources (i.e. the illuminated portion of the path). In the embodiment, energizing and de-energizing a light source may include, for example, changing or adjusting an illumination setting of the light source, such as the illumination intensity (i.e. brightening or dimming) by the light source, turning the light source off or on, and/or changing other characteristics of the light source, such as hue, in accordance with embodiments of the present invention.

In an embodiment, the operating instructions may be communicated from one instance of light source control device 130 to another, similar instance of light source control device 130 for controlling one or more of the identified light sources. That is, each controller may determine whether to turn on/off a light, and/or to adjust illumination settings of the light, not only based on the sound data received from its respectively associated acoustic sensors such as acoustic sensor 120, but also based on the decisions taken by its neighboring controllers. For example, if a controller (i.e. a first instance of light source control device 130) determines, based on its own respectively received sensor data, that a sound source is moving away from it, and also receives communication from another controller (i.e. a second instance of light source control device 130) indicating that there is another sound source approaching it, then the controller (i.e. the first instance of light source control device 130) will control the identified light sources to keep them energized for the approaching sound source, accordingly. In the embodiment, the operating instructions may be communicated between individual control devices (i.e. instances of light source control device 130) to enable distributed decision making for controlling illumination by individual lighting elements such as light source 110.

In an embodiment, light source control module 148 may determine and set individual illumination levels of the one or more identified and subsequently controlled light sources. The illumination levels may include, for example, low-, intermediate-, and high-intensity. In the embodiment, the illumination levels may be set based on, for example, a level of traffic along the path, a velocity of an object in motion along the path, a number and degree of turns of the path, and the like. The number and degree of turns of the path may be determined based on the topography data.

In an embodiment, the illumination level of an identified light source to be energized may be determined based on traffic attributes including speed, position, direction, and/or traffic density. That is, the higher the speed or velocity of an object in motion, or the higher the traffic density, the higher the illumination level may be set. For example, any time a sound sensor detects a sound and/or receives communication from neighboring controller and finds the direction of the vehicle to be approaching towards it, a computation may be performed according to the following function: Actual road distance of vehicle=fl (Vehicular Attributes (own), Vehicular Attributes (neighbor), Road topology).

At step 214, light source control module 148 determines whether a distance between the object in motion and the identified light sources exceeds a predetermined threshold. If it is determined that the distance between the object in motion and the identified light sources does not exceed the predetermined threshold, the method proceeds to (or remains at) Step S212.

At step 216, light source control module 148 controls operation of the identified light sources to de-energize the (previously energized) light sources. In an embodiment, the identified light sources may be controlled to de-energize in response to determining that a distance between the object in motion and the identified light sources exceeds the predetermined threshold, as described with reference to Steps S210 and S214. That is, once the distance between the object in motion and the identified light sources exceeds the predetermined threshold, the object in motion has passed beyond the effective illumination range of the identified and previously energized light sources, and so illumination may no longer be required.

In an embodiment, an energization duration may be determined to control de-energization of the energized light sources. For example, if an expected time of arrival of an approaching object in motion does not exceed a predetermined threshold, energization of a light source may be maintained. Other types of predefined rules may be implemented as a matter of design.

Figure 3A:
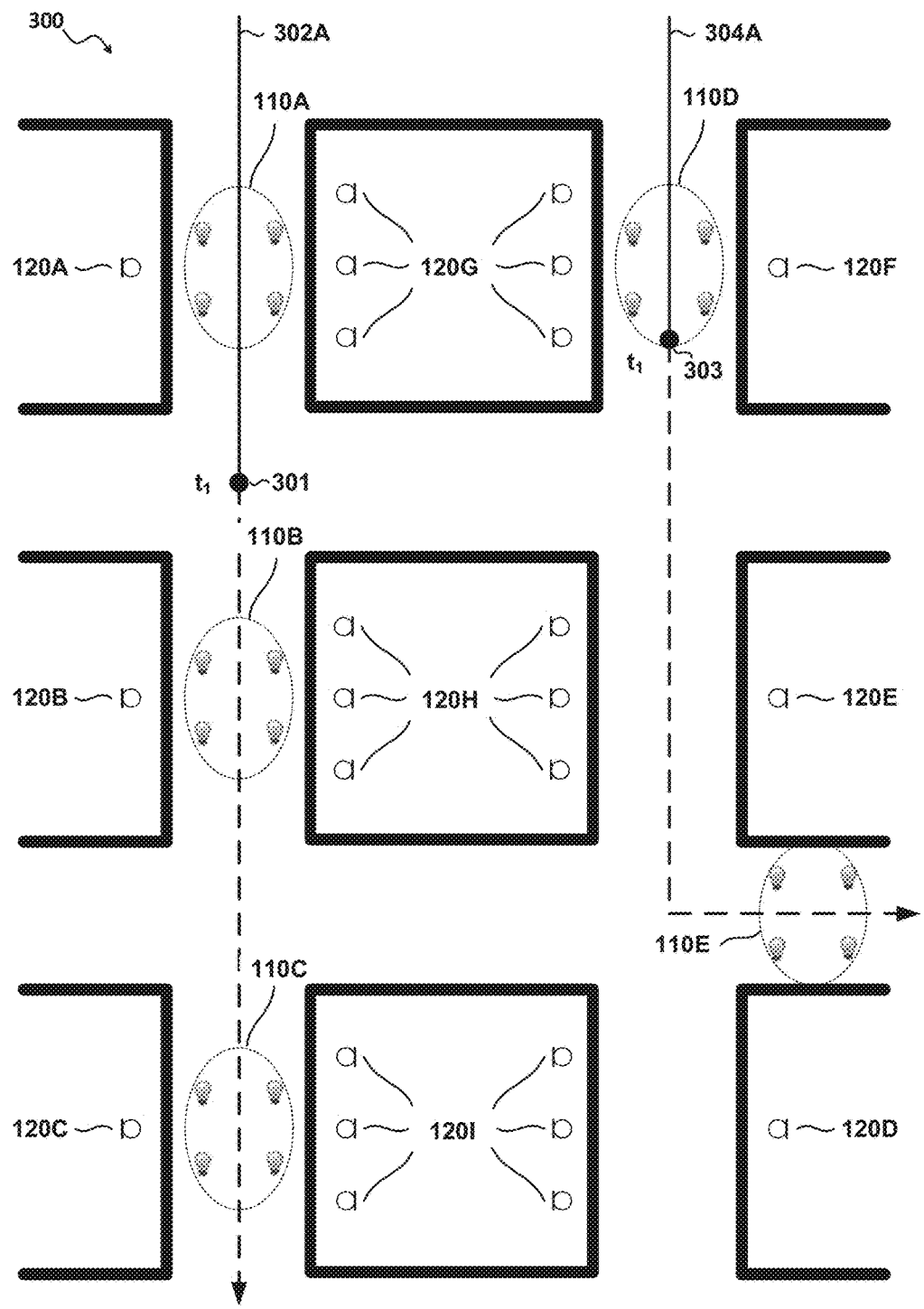
FIG. 3A is a block diagram depicting an illumination system in which the light source control system may be implemented, in accordance with an embodiment of the present invention.

FIG. 3A is a block diagram depicting an illumination system in which light source control system 100 may be implemented, in accordance with an embodiment of the present invention.

As depicted, light source control system 100 may include a sensor array composed of individual sensor nodes 120A-I. Sensor nodes 120A-I may be arranged along and with respect to path 300, a path to be illuminated by the illumination system, to detect sounds emitted by sound sources in motion along the path. The sound sources may include, for example, objects in motion 301 and 303, respectively. The illumination system may include individual light sources 110A-E, which may be controlled by light source control system 100 based on the detected sounds emitted by objects in motion 301 and 303. In this example scenario, sensor nodes 120A-F may be chosen to include unidirectional microphones, and sensor nodes 120G-I may be chosen to include omnidirectional microphones. The types of microphones may generally be chosen as a matter of design based on environmental characteristics such as the topography of the path to be illuminated.

In an example implementation, object in motion 301 moves along path 300 according to spatio-temporal trajectory 302A, and is positioned between light sources 110A and 110B at a first time instance, $t_1$, as depicted in FIG. 3A. In this example scenario, the trajectory 302A and the position of object in motion 301 at the first time instance, $t_1$, are determined based on the sounds detected by sensor nodes 120A, 120B, 120G, and 120H. For example, the amplitude of the sounds detected by sensor nodes 120A and 120G may increasingly reduce in amplitude, and be associated with a corresponding doppler shift indicative of object in motion 301 moving away from sensor nodes 120A and 120G. Further, at around the same time, the amplitude of the sounds detected by sensor nodes 120B and 120H may increase in amplitude, and be associated with a corresponding doppler shift indicative of object in motion 301 moving toward sensor nodes 120B and 120H. Accordingly, light source control system 100 may determine the position of object in motion 301 at the first time instance, $t_1$, based on the amplitudes of the sounds detected by sensor nodes 120A, 120B, 120G, and 120H with respect to the known positions of each sensor node 120A, 120B, 120G, and 120H along path 300, respectively. Light source control system 100 may determine the spatio-temporal trajectory 302A based on velocities of object in motion 301, and associated positions of object in motion 301 at corresponding time instances (e.g. such as at those time instances preceding the first time instance, $t_1$). Alternatively, light source control system 100 may determine the spatio-temporal trajectory 302A based on the corresponding doppler shift. Based on the determined spatio-temporal trajectory 302A, light source control system 100 may control the operation of light sources 110A and 110B to, for example, reduce illumination intensity provided by light source 110A and increase illumination intensity provided by light source 110B at the first time instance, $t_1$.

In the example implementation, object in motion 303 moves along path 300 and is positioned about light source 110D at the first time instance, $t_1$, as depicted in FIG. 3A. In this example scenario, the spatio-temporal trajectory 304A and the position of object in motion 303 at the first time instance, $t_1$, are determined based on the sounds detected by sensor nodes 120G, 120H, 120F, and 120E. For example, the amplitude of the sounds detected by sensor nodes 120G and 120F may increasingly reduce in amplitude, and be associated with a corresponding doppler shift indicative of object in motion 303 moving away from sensor nodes 120G and 120F. Further, at around the same time, the amplitude of the sounds detected by sensor nodes 120H and 120E may increase in amplitude, and be associated with a corresponding doppler shift indicative of object in motion 303 moving toward sensor nodes 120H and 120E. Accordingly, light source control system 100 may determine the position of object in motion 303 at the first time instance, $t_1$, based on the amplitudes of the sounds detected by sensor nodes 120G, 120H, 120F, and 120E with respect to the known positions of each sensor node 120G, 120H, 120F, and 120E along path 300, respectively. Light source control system 100 may determine the spatio-temporal trajectory 304A based on velocities of object in motion 303, and associated positions of object in motion 303 at corresponding time instances such as the first time instance, $t_1$. Alternatively, light source control system 100 may determine the spatio-temporal trajectory 304A based on the corresponding doppler shift. Based on the determined spatio-temporal trajectory 304A, light source control system 100 may control the operation of light source 110D to, for example, reduce illumination intensity as object in motion 303 moves out of the illumination zone provided by light source 110D at the first time instance, $t_1$.

Figure 3B:
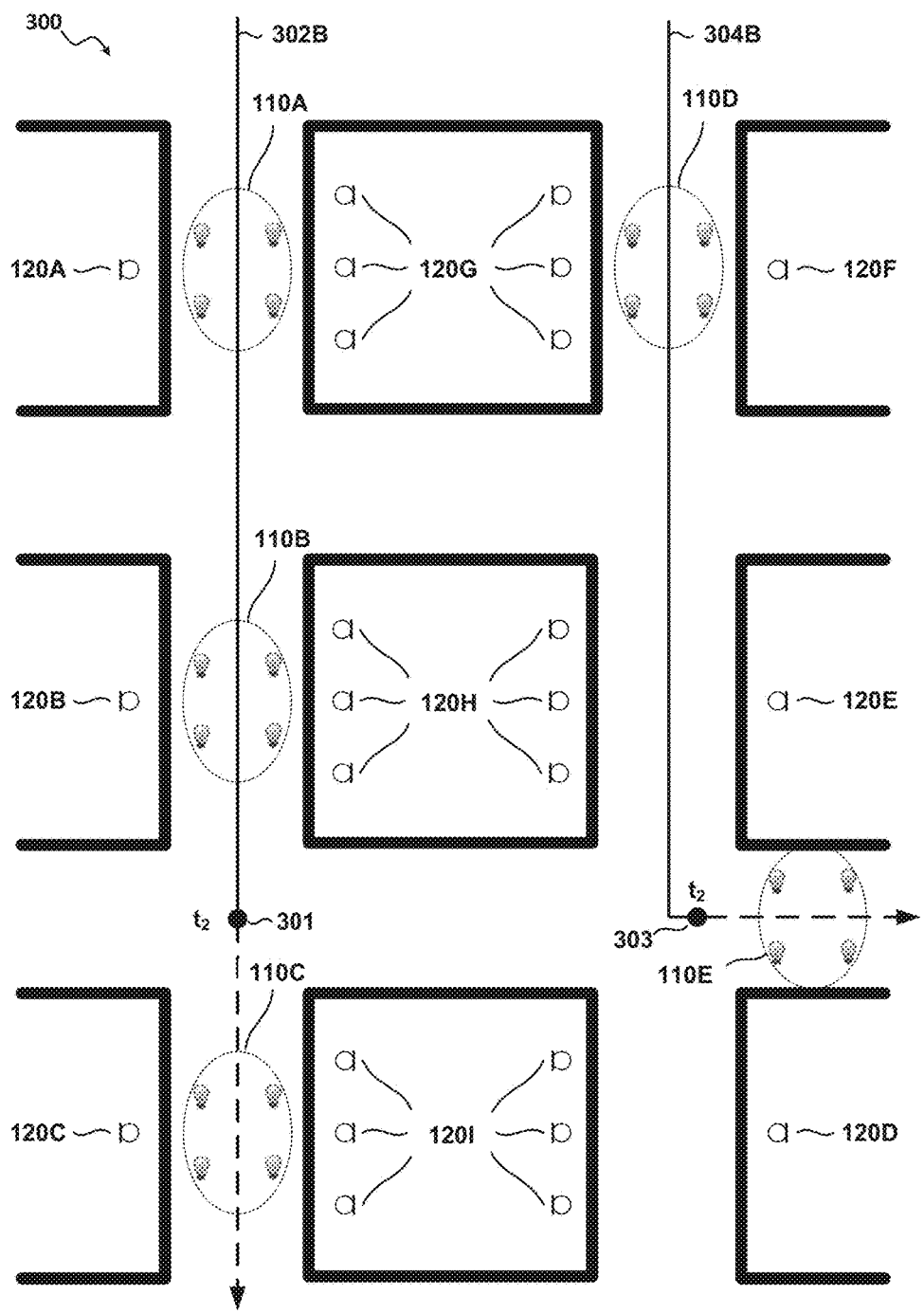
FIG. 3B is a block diagram depicting the illumination system in which the light source control system may be implemented, in accordance with an embodiment of the present invention.

FIG. 3B is a block diagram depicting an illumination system in which light source control system 100 may be implemented, in accordance with an embodiment of the present invention.

As depicted, at a second time instance, $t_2$, both objects in motion 301 and 303 have moved along their respective paths beyond their previous positions at the first time instance, $t_1$.

In the example implementation, object in motion 301 has moved along path 300 according to spatio-temporal trajectory 302B, and is positioned between light sources 110B and 110C at the second time instance, $t_2$, as depicted in FIG. 3B. The trajectory 302B and the position of object in motion 301 at the second time instance, $t_2$, are determined based on the sounds detected by sensor nodes 120B, 120C, 120H, and 120I. For example, the amplitude of the sounds detected by sensor nodes 120B and 120H (at time $t_1$) may increasingly reduce in amplitude, and be associated with a corresponding doppler shift indicative of object in motion 301 moving away from sensor nodes 120B and 120H. Further, at around the same time, the amplitude of the sounds detected by sensor nodes 120C and 120I may increase in amplitude, and be associated with a corresponding doppler shift indicative of object in motion 301 moving toward sensor nodes 120C and 120I. Accordingly, light source control system 100 may determine the position of object in motion 301 at the second time instance, $t_2$, based on the amplitudes of the sounds detected by sensor nodes 120B, 120C, 120H, and 120I with respect to the known positions of each sensor node 120B, 120C, 120H, and 120I along path 300, respectively. Light source control system 100 may determine the spatio-temporal trajectory 302B in a manner similar to that used to determine the spatio-temporal trajectory 302A, as described with reference to FIG. 3A. Based on the determined spatio-temporal trajectory 302B, light source control system 100 may control the operation of light sources 110B and 110C to, for example, reduce illumination intensity provided by light source 110B and increase illumination intensity provided by light source 110C at the second time instance, $t_2$.

In the example implementation, object in motion 303 moves along path 300 and is positioned generally ahead of and adjacent to light source 110E at the second time instance, $t_2$, as depicted in FIG. 3B. In this example scenario, the spatio-temporal trajectory 304B and the position of object in motion 303 at the second time instance, $t_2$, are determined based on the sounds detected by sensor nodes 120H, 120I, 120E, and 120D. For example, the amplitude of the sounds detected by sensor nodes 120H and 120I (at time $t_2$) may increasingly reduce in amplitude, and be associated with a corresponding doppler shift indicative of object in motion 303 moving away from sensor nodes 120H and 120I. Further, at around the same time, the amplitude of the sounds detected by sensor nodes 120E and 120D may increase in amplitude, and be associated with a corresponding doppler shift indicative of object in motion 303 moving toward sensor nodes 120E and 120D. Accordingly, light source control system 100 may determine the position of object in motion 303 at the second time instance, $t_2$, based on the amplitudes of the sounds detected by sensor nodes 120H, 120I, 120E, and 120D with respect to the known positions of each sensor node 120H, 120I, 120E, and 120D along path 300, respectively. Light source control system 100 may determine the spatio-temporal trajectory 304B based on velocities of object in motion 303, and associated positions of object in motion 303 at corresponding time instances such as the second time instance, $t_2$. Alternatively, light source control system 100 may determine the spatio-temporal trajectory 304B based on the corresponding doppler shift. Based on the determined spatio-temporal trajectory 304B, light source control system 100 may control the operation of light source 110D and 110E to, for example, reduce illumination intensity provided by light source 110D and increase illumination intensity provided by light source 110E at the second time instance, $t_2$.

FIG. 4 is a block diagram depicting light source 110, acoustic sensor 120, and/or light source control device 130, in accordance with an embodiment of the present invention. As depicted in FIG. 4, light source 110, acoustic sensor 120, and/or light source control device 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as light source control program 140 residing on light source control device 130, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Light source 110, acoustic sensor 120, and/or light source control device 130 may also include a R/W drive or interface 914 to read from and write to one or more portable computer readable storage media 926. Application programs 911 on light source 110, acoustic sensor 120, and/or light source control device 130 may be stored on one or more of the portable computer readable storage media 926, read via the respective R/W drive or interface 914 and loaded into the respective computer readable storage media 908. Light source 110, acoustic sensor 120, and/or light source control device 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 220 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Light source 110, acoustic sensor 120, and/or light source control device 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Light source 110, acoustic sensor 120, and/or light source control device 130 can be a standalone network server, or represent functionality integrated into one or more network systems. In general, light source 110, acoustic sensor 120, and/or light source control device 130 can be a laptop computer, desktop computer, specialized computer server, or any other computer system known in the art. In certain embodiments, light source 110, acoustic sensor 120, and/or light source control device 130 represents computer systems utilizing clustered computers and components to act as a single pool of seamless resources when accessed through a network, such as a LAN, WAN, or a combination of the two.

This implementation may be preferred for data centers and for cloud computing applications. In general, light source 110, acoustic sensor 120, and/or light source control device 130 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
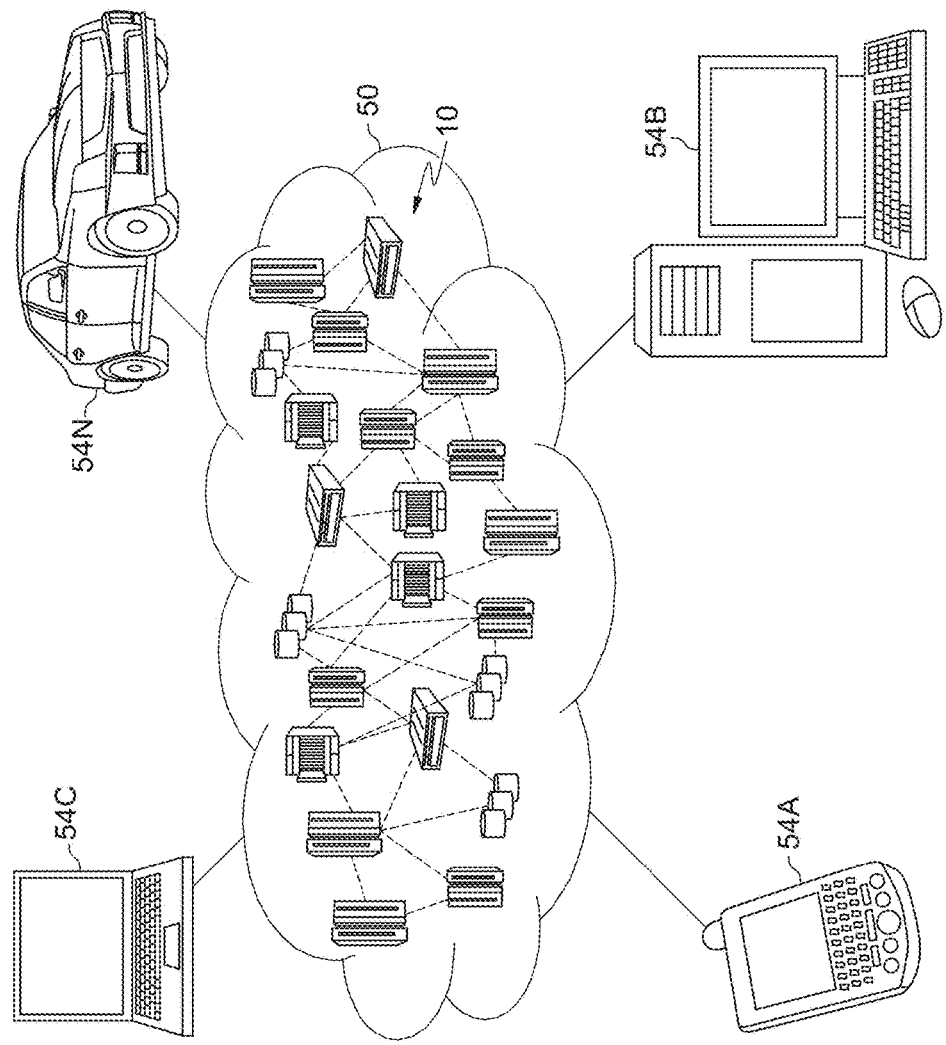
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
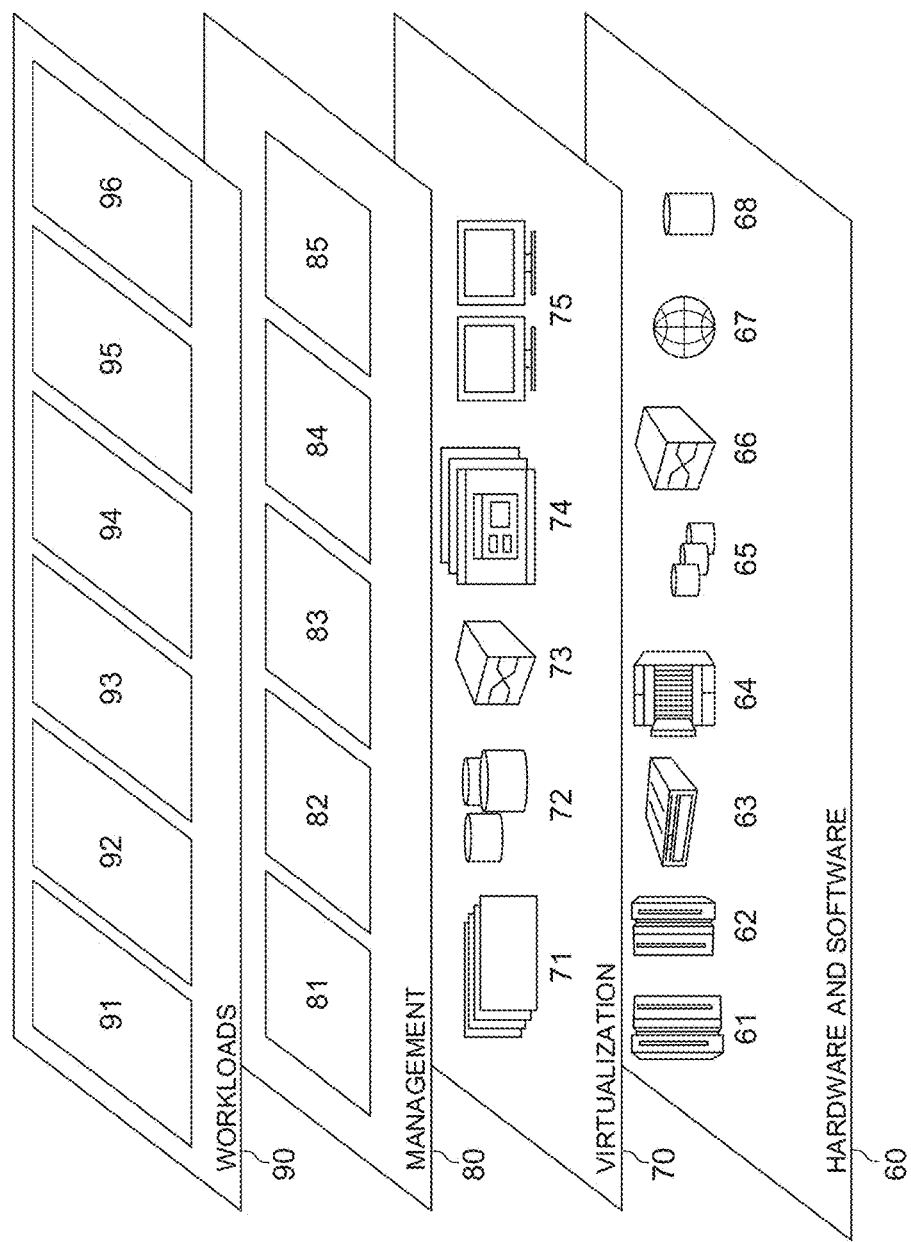
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and light source controlling 96. Light source controlling 96 may include functionality enabling the cloud computing environment to perform light source control of a lighting system to provide selective illumination of a path, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for acoustics-based light source control of a lighting system, wherein the lighting system is configured to illuminate a path, the method comprising:
   detecting, by one or more acoustic sensors, sounds emitted by a sound source from positions located along the path;
   determining a velocity of the sound source with respect to a point on the path based on the detected sound emissions;
   determining a spatio-temporal trajectory of the sound source based on the determined velocity and a topography of the path at the positions of the sound source, wherein the trajectory corresponds to a length of the path and is associated with a direction of motion of the sound source along the path;
   identifying one or more light sources of the lighting system positioned adjacent to the determined spatio-temporal trajectory based on the topography of the path at the positions of the sound source, the positions of the one or more light sources along the path, and the determined spatio-temporal trajectory; and
   in response to determining that a distance between the sound source and the identified light sources does not exceed a predetermined threshold,
      energizing the one or more light sources to illuminate the length of the path ahead of the sound source.

2. The computer-implemented method of claim 1, further comprising:
   in response to determining that a distance between the sound source and the identified light sources exceeds the predetermined threshold,
      de-energizing the identified light sources.

3. The computer-implemented method of claim 1, further comprising:
   mapping the topography of the path at the positions of the sound source to the positions of the one or more identified light sources along the path.

4. The computer-implemented method of claim 1, further comprising:
   modulating illumination intensity of the one or more energized light sources based on a position and the velocity of the sound source and positions of the light sources along the path.

5. The computer-implemented method of claim 4, wherein energizing the one or more light sources to illuminate the length of the path ahead of the sound source comprises:
   detecting, by one or more acoustic sensors, sounds emitted by sound sources from positions located along the path; and
   modulating illumination intensity of the one or more energized light sources based on a number of the detected sound sources.

6. The computer-implemented method of claim 1, wherein the trajectory comprises a length of the path ahead of and coinciding with the direction of motion of the sound source along the path.

7. The computer-implemented method of claim 1, further comprising:
   communicating, among light source controllers, data corresponding to one or more of the detected sound emissions, the determined velocity, and the topography of the path with respect to the positions of the sound source along the path, wherein the data is implemented by each light source controller to control energization of one or more of the light sources positioned adjacent to the determined trajectory of the sound source.

8. The computer-implemented method of claim 1, wherein determining the velocity of the sound source based on the detected sound emissions comprises:
   determining a first and second position of the sound source with respect to first and second time periods based on the detected sounds emitted by the sound source during each respective period;
   determining a direction of motion of the sound source based on respective distances of the determined first and second positions from a reference point, wherein the reference point corresponds to a location of an acoustic sensor by which the emitted sounds are detected; and determining a speed of the sound source by division of a first quantity by a second quantity, wherein the first quantity comprises a difference between the respective distances of the first and second positions from the reference point, and wherein the second quantity comprises a time lag between the first and second time periods during which the emitted sounds are detected.

9. The computer-implemented method of claim 1, wherein determining the velocity of the sound source based on the detected sound emissions comprises:

determining a first position of the sound source with respect to a first time period based on the detected sounds emitted by the sound source during the first period and sounds detected by a first acoustic sensor with respect to a first reference point corresponding to a location of the first acoustic sensor, wherein the first position of the sound source corresponds to the location of the first reference point during the first time period at a point when an intensity of the detected sounds transitions from increasing to decreasing;

determining a second position of the sound source with respect to a second time period based on the detected sounds emitted by the sound source during the second period and sounds detected by a second acoustic sensor with respect to a second reference point corresponding to a location of the second acoustic sensor, wherein the second position of the sound source corresponds to the location of the second reference point during the second time period at a point when an intensity of the detected sounds transitions from increasing to decreasing;

determining a direction of motion of the sound source based on the relative locations of the first and second reference points and an order in which the first and second position of the sound source coincides with the locations of the first and second reference points; and determining a speed of the sound source by division of a first quantity by a second quantity, wherein the first quantity comprises a distance between the first and second reference points, and wherein the second quantity comprises a time lag beginning at the point during the first time period at which the intensity of the detected sounds transitions from increasing to decreasing, and ending at the point during the second time period at which the intensity of the detected sounds transitions from increasing to decreasing.

10. A computer system for acoustics-based light source control of a lighting system, wherein the lighting system is configured to illuminate a path, the computer system comprising:

one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:

detecting, by one or more acoustic sensors, sounds emitted by a sound source from positions located along the path;

determining a velocity of the sound source with respect to a point on the path based on the detected sound emissions;

determining a spatio-temporal trajectory of the sound source based on the determined velocity and a topography of the path at the positions of the sound source, wherein the trajectory corresponds to a length of the path and is associated with a direction of motion of the sound source along the path;

identifying one or more light sources of the lighting system positioned adjacent to the determined spatio-temporal trajectory based on the topography of the path at the positions of the sound source, the positions of the one or more light sources along the path, and the determined spatio-temporal trajectory; and in response to determining that a distance between the sound source and the identified light sources does not exceed a predetermined threshold, energizing the one or more light sources to illuminate the length of the path ahead of the sound source.

11. The computer system of claim 10, the method further comprising:

in response to determining that a distance between the sound source and the identified light sources exceeds the predetermined threshold, de-energizing the identified light sources.

12. The computer system of claim 10, further comprising:

mapping the topography of the path at the positions of the sound source to the positions of the one or more identified light sources along the path.

13. The computer system of claim 10, the method further comprising:

modulating illumination intensity of the one or more energized light sources based on a position and the velocity of the sound source and positions of the light sources along the path.

14. The computer system of claim 13, the method further comprising:

detecting, by one or more acoustic sensors, sounds emitted by sound sources from positions located along the path; and modulating illumination intensity of the one or more energized light sources based on a number of the detected sound sources.

15. The computer system of claim 10, wherein the trajectory comprises a length of the path ahead of and coinciding with the direction of motion of the sound source along the path.

16. The computer system of claim 10, the method further comprising:

communicating, among light source controllers, data corresponding to one or more of the detected sound emissions, the determined velocity, and the topography of the path with respect to the positions of the sound source along the path, wherein the data is implemented by each light source controller to control energization of one or more of the light sources positioned adjacent to the determined trajectory of the sound source.

17. The computer system of claim 10, wherein determining the velocity of the sound source based on the detected sound emissions comprises:

determining a first and second position of the sound source with respect to first and second time periods based on the detected sounds emitted by the sound source during each respective period;

determining a direction of motion of the sound source based on respective distances of the determined first and second positions from a reference point, wherein the reference point corresponds to a location of an acoustic sensor by which the emitted sounds are detected; and determining a speed of the sound source by division of a first quantity by a second quantity, wherein the first quantity comprises a difference between the respective distances of the first and second positions from the reference point, and wherein the second quantity comprises a time lag between the first and second time periods during which the emitted sounds are detected.

18. A computer program product for acoustics-based light source control of a lighting system, wherein the lighting system is configured to illuminate a path, the computer program product comprising:

one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:

detecting, by one or more acoustic sensors, sounds emitted by a sound source from positions located along the path;

determining a velocity of the sound source with respect to a point on the path based on the detected sound emissions;

determining a spatio-temporal trajectory of the sound source based on the determined velocity and a topography of the path at the positions of the sound source, wherein the trajectory corresponds to a length of the path and is associated with a direction of motion of the sound source along the path;

identifying one or more light sources of the lighting system positioned adjacent to the determined spatio-temporal trajectory based on the topography of the path at the positions of the sound source, the positions of the one or more light sources along the path, and the determined spatio-temporal trajectory; and in response to determining that a distance between the sound source and the identified light sources does not exceed a predetermined threshold, energizing the one or more light sources to illuminate the length of the path ahead of the sound source.

19. The computer program product of claim 18, the method further comprising:

in response to determining that a distance between the sound source and the identified light sources exceeds the predetermined threshold, de-energizing the identified light sources.

20. The computer program product of claim 18, the method further comprising:

mapping the topography of the path at the positions of the sound source to the positions of the one or more identified light sources along the path.

* * * * *